(12) United States Patent
Asmus et al.

(10) Patent No.: US 11,621,100 B2
(45) Date of Patent: Apr. 4, 2023

(54) NOBLE-METAL PASTES FOR SCREEN-PRINTED ELECTRODE STRUCTURES

(71) Applicant: Heraeus Nexensos GmbH, Kleinostheim (DE)

(72) Inventors: Tim Asmus, Allendorf-Winnen (DE); Stefan Dietmann, Alzenau (DE); Christoph Nick, Gelnhausen (DE)

(73) Assignee: Heraeus Nexensos GmbH, Kleinostheim (DE)

( * ) Notice: Subject to any disclaimer, the term of this patent is extended or adjusted under 35 U.S.C. 154(b) by 0 days.

(21) Appl. No.: 17/295,687

(22) PCT Filed: Oct. 29, 2019

(86) PCT No.: PCT/EP2019/079497
§ 371 (c)(1),
(2) Date: May 20, 2021

(87) PCT Pub. No.: WO2020/104147
PCT Pub. Date: May 28, 2020

(65) Prior Publication Data
US 2022/0013248 A1  Jan. 13, 2022

(30) Foreign Application Priority Data

Nov. 21, 2018 (EP) .................................... 18207593

(51) Int. Cl.
*H01B 1/22* (2006.01)
*C09D 5/24* (2006.01)
*G01N 15/10* (2006.01)

(52) U.S. Cl.
CPC ............... *H01B 1/22* (2013.01); *C09D 5/24* (2013.01); *G01N 15/1031* (2013.01)

(58) Field of Classification Search
CPC .............. H01B 1/00; H01B 1/16; H01B 1/22; C09D 5/24
See application file for complete search history.

(56) References Cited

U.S. PATENT DOCUMENTS

| | | | |
|---|---|---|---|
| 2,610,128 A | 9/1952 | Kerridge et al. | |
| 3,854,957 A | 12/1974 | Larry | |
| 4,394,171 A | 7/1983 | Nair | |
| 4,416,932 A * | 11/1983 | Nair | H01G 4/0085 427/63 |
| 4,450,671 A * | 5/1984 | Love | A01F 12/30 460/85 |
| 4,963,187 A * | 10/1990 | Kondo | H01L 23/49883 252/514 |
| 5,345,212 A * | 9/1994 | Brown | H01C 17/0658 252/514 |
| 6,410,081 B1 | 6/2002 | De La Prieta et al. | |
| 6,663,798 B2 | 12/2003 | Sato et al. | |
| 8,193,707 B2 * | 6/2012 | Matsuno | H01B 1/22 313/586 |
| 3,233,019 A1 | 7/2012 | Ninomiya et al. | |
| 9,997,653 B2 * | 6/2018 | Hayashi | H01L 31/1864 |
| 2011/0223713 A1 * | 9/2011 | Akimoto | H01L 31/022425 438/98 |
| 2011/0314796 A1 | 12/2011 | Nakamura et al. | |
| 2013/0004659 A1 | 1/2013 | Glicksman et al. | |
| 2015/0203694 A1 | 7/2015 | Glicksman et al. | |

FOREIGN PATENT DOCUMENTS

| | | |
|---|---|---|
| CN | 103620074 | 3/2014 |
| DE | 19842276 | 3/2000 |
| DE | 10 2008 041 707 | 3/2010 |
| EP | 0071928 | 2/1983 |
| JP | H1-317183 | 12/1989 |
| JP | H11-242913 | 9/1999 |
| JP | 2006-108530 | 4/2006 |
| JP | 2010158873 | 7/2010 |
| JP | 2012-12960 | 1/2012 |
| JP | 2016-100243 | 5/2016 |
| KR | 2002-0005514 | 1/2002 |
| KR | 20130107766 | 10/2013 |
| WO | 2013/003506 | 1/2013 |

OTHER PUBLICATIONS

Written Opinion of the International Searching Authority for PCT/EP2019/079497 dated Jan. 15, 2020.

* cited by examiner

*Primary Examiner* — Mark Kopec
(74) *Attorney, Agent, or Firm* — Dicke, Billig & Czaja, PLLC

(57) ABSTRACT

The present invention relates to a screen-printing paste composition for producing an electrical conductor arrangement, which screen-printing paste composition comprises particulate noble metal, comprising platinum and palladium, metal oxides, and organic binders and/or solvents, the proportion of the metal oxides in the screen-printing paste composition being 5 to 15 wt. %, based on the total amount of platinum and metal oxides. Suitable screen-printing paste compositions can be processed to form composite products by means of application to a substrate, subsequent drying and baking, which composite products can be used, for example, in particle sensors or heating devices. The particle sensors and heating devices thus produced are characterized by improved adhesion to the substrate at high temperatures and by conductivity, and demonstrated very good reproducibility of the electrical resistance in different production batches.

8 Claims, No Drawings

NOBLE-METAL PASTES FOR SCREEN-PRINTED ELECTRODE STRUCTURES

CROSS REFERENCE TO RELATED APPLICATIONS

This Utility Patent Application claims priority under 35 U.S.C. § 371 to International Application Serial No. PCT/EP2019/079497, filed Oct. 29, 2019, which claims the benefit of EP Patent Application No. EP 18207593.7, filed Nov. 21, 2018; which are both incorporated herein by reference.

The present invention relates to an improved screen-printing paste composition for producing electrical conductor arrangements, which are based on particulate noble metals, metal oxides and/or fast binders and/or solvents, and in which the proportion of the metal oxides in the screen-printing paste composition is 5 to 15 wt. % based on the total amount of noble metal and metal oxides. The present invention furthermore relates to methods for the production of electrical conductor arrangements using the specified screen-printing paste compositions, composite products made from a ceramic substrate and an electrical conductor arrangement produced according to the method as well as (soot) particle sensors and heating devices.

PRIOR ART

In the case of diesel particle filters, the particle emission must be monitored in accordance with legal regulations, particularly in the case of vehicles during vehicle operation. Furthermore, a load prediction of diesel particle filters for regeneration monitoring is necessary, in order to ensure a high system reliability in the case of low efficiency, fuel-saving regeneration cycles and in order to be able to use cost-effective filter materials.

One option for this is offered by resistive particle sensors, which have an electrode system with at least two electrodes freely exposed to the exhaust gas, on or between which the particles to be detected, generally soot particles, are deposited under the influence of an applied electrical field and which lead to a resistance and/or impedance change. Today, such resistive particle sensors are generally produced from platinum.

In order to improve the adhesion of the electrodes on a substrate and reduce the platinum content and thus the costs, electrodes for particle detection are for the most part produced from a platinum-ceramic mixture, for example comprising aluminium oxide, zirconium oxide, yttrium oxide, cerium oxide, particularly alpha-aluminium oxide. Electrodes of this type generally have a very porous structure, however, and thus a particularly large surface accessible for the exhaust gas. This is connected with the disadvantage that from a temperature of approximately 800° C., platinum is increasingly oxidized to form ($PtO_2$) and eroded, which has the consequence of a gradual impairment of the sensor characteristics.

To solve this problem, it was suggested in DE 10 2008 041 707 A1 to produce corresponding electrodes from a platinum-glass mixture, wherein the platinum and the glass are present in the electrode homogeneously and wherein the glass has a fusion temperature of 1000° C. Due to such an electrode structure, pores and intermediate spaces inside the electrodes can be minimized, and thus an oxidative attack on the platinum is made considerably more difficult. In addition, the electrodes can be produced using a screen-printing method, wherein a mixture of the materials, from which the electrodes are formed, is applied onto a ceramic substrate. The electrodes are then produced due to subsequent heating of the mixture to a temperature above the fusion temperature of the glass precursors.

In DE 10 2008 041 707 A1, glasses based on $SiO_2/B_2O_3/Al_2O_3$ are described as exemplary glass compositions, which can be supplemented by further metal oxides, such as calcium oxide, zinc oxide, magnesium oxide, zirconium oxide and barium oxide. However, a disadvantage of such glasses is their significant proportion of $B_2O_3$, as the boron ions act as a platinum poison. This leads to an impairment of the stability at high temperatures of the conductor tracks produced.

DE 198 42 276 A1 describes a paste for welding ceramics to metals, in which platinum particles, metal oxides such as aluminium oxide, silicon dioxide and barium oxide, and organic binders and plasticizers are used. The compositions described in DE 198 42 276 A1 have relatively high contents of oxidic materials (more than 20% with respect to the total amount of platinum metal oxides), which results in an insufficient conductivity for particle detectors.

US 2015/0203694 A1 describes pastes for forming conductive thick films, which contain platinum powder as a conductivity-imparting constituent. In addition to the platinum, the film pastes described in US 2015/0203694 A1 may contain up to 7% "fritted glass" and 0 to 3 inorganic oxide. The fritted-glass materials mentioned by way of example have relatively high proportions of $B_2O_3$ (approximately 35%).

KR 20130107766 discloses electrode-paste compositions having 5 to 20 wt. % inorganic binder, 0.5 to 20 wt. % organic binder and 4.5 to 20 wt. % organic solvent. Specific glass powders with a content of $B_2O_3$ in the region of 9 to 22% are described as inorganic binders, which are based either on $Bi_2O_3$ or PbO as base material (i.e. this material forms the largest component in glass). One problem of known screen-printing pastes for producing conductive prints also consists in the often insufficient substrate adhesion, particularly at increased temperatures, which leads to an undesirably low durability of electrical conductor arrangements and particularly particle sensors produced therefrom. Against this background, the object of the present invention consisted in suggesting an improved screen-printing paste for producing electrical conductor arrangements, which, following the application onto a ceramic substrate and following thermal treatment, delivers electrode or conductor structures, which reliably and persistently adhere on the ceramic substrate, even at high temperatures.

DESCRIPTION OF THE INVENTION

According to a first aspect, the present invention therefore relates to a screen-printing paste composition for producing an electrical conductor arrangement, wherein the screen-printing paste composition contains particulate noble metal comprising platinum or palladium, metal oxides, and organic binders and/or solvents and wherein the proportion of the metal oxides in the screen-printing paste composition is from 5 to 15 wt. % based on the total amount of noble metal and metal oxides.

A proportion of the metal oxides in the screen-printing paste composition of 8 to 15 wt. %, further preferably 10 to 14 wt. %, even further preferably 11 to 13 wt. % and even further preferably approximately 12 wt. % based on the total amount and metal oxides, can be specified as particularly beneficial.

In the context of the present invention, the term "noble metal" designates the metals Ru, Rh, Pd, Ag, Os, Ir, Pt, Au and Hg.

The particulate noble metal, which is used in this screen-printing paste composition, is not subject to any relevant limitation, with the proviso that the noble metal should be as stable as possible in the event of oxygen contact, even at high temperatures (>750° C.), in order to ensure the stability of an electrical conductor arrangement produced therefrom. Noble metals which fulfil this requirement in particular are platinum, alloys made from platinum with other noble metals, particularly with rhodium or silver/palladium alloys. Unalloyed platinum has the advantage compared to the alloys mentioned made from platinum/rhodium, that an external oxide layer is not formed, even at high temperatures (in the case of platinum/rhodium, a rhodium oxide skin), so that the particulate noble metal is preferably present in the form of (unalloyed) platinum in the context of the present invention. In the context of this invention, a platinum with a purity of at least 99% and preferably at least 99.5% is termed "unalloyed" platinum.

The shape of the particulate noble metal is likewise not subject to any relevant limitations; it is consequently possible to use spherical particles, spheroidal particles, platelet-shaped particles, etc. Preferably, however, the particulate noble metal is present in a spherical shape.

The particle size of the noble metal depends on the application for which the screen-printing paste composition should be used. That is to say, the maximum diameter of particles present in the screen-printing paste composition should, to the greatest extent possible, be smaller than the thickness of a conductor structure to be produced therefrom. A range of 0.05 to 10 µm, preferably a range of 0.1 to 5 µm and particularly preferably 0.3 to 2 µm are specified as a particularly suitable average particle size D50. In this case, the particle size is expediently to be determined with the aid of the analysis of electron-microscopic images.

In the context of the present invention, a platinum powder with the following properties is very particularly preferred as particulate noble metal: platinum proportion: 99.7 specific surface area (BET): 0.8-1.2 m$^2$/g, particle size distribution: D10: 0.2-0.5 µm, D50: 0.4-1.0 µm, D90: ≤2.5 µm and powder density: 9.0-11.5 g/cm$^3$.

In the context of the present application, oxides of metals or metalloids, such as silicon, which contain oxygen as counterion are termed "metal oxides". In the context of the present invention, the metal oxides preferably do not comprise any boron oxides, such as $B_2O_3$, however, as these constitute a catalyst poison with respect to platinum, as mentioned previously, and can therefore impair the functionality of electrical conductor arrangements produced from screen-printing paste compositions. Consequently, the content of boron oxides in the metal oxides should preferably be 2 wt. %, particularly preferably 1 wt. %, wherein the weight proportions relate to the total weight of the metal oxides in the screen-printing paste composition. It is very particularly preferred if the metal oxides do not contain any boron oxides apart from unavoidable contaminants.

The metal oxides or the mixture thereof are expediently selected in such a manner that they soften at a temperature in the region of 1000 to approximately 1400° C., so that a "sintering" to form a uniform glass body is possible in this temperature range. In the context of the present invention, mixtures based on $SiO_2$, $Al_2O_3$ and BaO have proven particularly expedient for this. For these mixtures, it is preferred if they contain $SiO_2$, $Al_2O_3$ and BaO in a proportion of at least 60 wt. %, preferably at least 70 wt. %, further preferably at least 80 wt. % and even further preferably at least 90 wt. % with respect to the total amount of the metallic oxides in the screen-printing paste composition.

In the context of the investigations on which this invention is based, it has been shown that a relatively high content of BaO in the metal oxides of the screen-printing paste composition is advantageous. Thus, this proportion is preferably more than 20 wt. %, particularly more than 30 wt. % and very particularly preferably more than 35 wt. %. An even further preferred proportion of BaO preferably lies in the range from 40 to 50 wt. %, particularly 40 to 49 wt. %, even more preferably 42 to 48 wt. % and most preferably approximately 45 wt. %.

The proportion of $SiO_2$ in the mixtures based on $SiO_2$, $Al_2O_3$ and BaO should expediently be 33 to 43 wt. %, preferably 33 to 42 wt. %, further preferably 35 to 41 wt. %, and in particular approximately 38 wt. %. A proportion of between 10 and 20 wt. %, preferably 12 to 18 wt. % and in particular approximately 15 wt. % may be specified as a suitable proportion of $Al_2O_3$. In these data, "wt. %" relates to the total weight of the metal oxides in the screen-printing paste composition in each case.

For the screen-printing paste composition according to the invention, it is furthermore preferred, if it contains a smallest possible proportion of further oxidic components (i.e. different from $SiO_2$, $Al_2O_3$ and BaO), wherein a suitable proportion by weight for such further oxidic components with 2 wt. % and preferably 1 wt. % can be specified.

To achieve a suitable processability, further additives, such as organic binders, solvents, plasticizers, etc. can be added to the screen-printing paste composition. As an example for a particularly suitable organic binder, ethyl cellulose among others may be mentioned, but alternatively, binders such as polyvinyl butyral, hydroxy celluloses, such as hydroxypropyl cellulose and/or polymethacrylates of short-chain (preferably $C_1$-$C_4$) alcohols can also be used. To impart a suitable viscosity, an organic solvent may be added to the screen-printing paste composition. Suitable organic solvents in this context are ester alcohols and terpenes, such as alpha- or beta-terpineol or mixtures thereof with other solvents such as kerosene, dibutyl sebacate, diethylene glycol butyl ether, diethylene glycol butyl ether acetate, hexylene glycol, dioctyl sebacate, 2,2,4-trimethyl-1,3-pentanediol monoisobutyrate (texanol) or high-boiling alcohols, such as 2-(2-butoxyethoxy)ethanol. A very particularly preferred solvent for the screen-printing paste composition according to the invention is 2,2,4-trimethyl-1,3-pentanediol monoisobutyrate.

Suitable plasticizers contain phthalate-based plasticizers, such as dibutyl phthalate or dioctyl phthalate, in particular.

In a further aspect, the present invention relates to a method for producing an electrical conductor arrangement on a ceramic substrate, wherein the method contains the steps
- applying a screen-printing paste composition, as described previously, onto the ceramic substrate, and
- drying and subsequently baking the screen-printing paste composition and creating an electrical conductor arrangement.

The application of the screen-printing paste composition expediently takes place using a screen-printing technology.

In the context of this method, the drying should expediently be carried out in such a manner that within the drying step, a relevant proportion of the solvent is removed from the applied composition. Particularly a temperature of more than 60° C. and in particular more than 80° C. has proven suitable for the drying. At least 30 minutes and preferably a range of approximately 60 to 90 minutes may be specified as a suitable time period for the drying.

A drying profile with the following course has proven particularly suitable: The temperature of the drying oven is increased from room temperature to 35° C. and held there for 10 min. Subsequently, the temperature is increased to 83° C. and held there for 20 min. Subsequently, the temperature is increased to 156° C. and held there for 30 min. The subsequent baking of the screen-printing paste composition takes place at a temperature at which organic constituents still contained in the screen-printing paste composition are decomposed to form gaseous products, so that a uniform composite of noble-metal particles and metal oxides forms. In addition, the temperature during baking is greater than or equal to the fusion point of the metal oxide mixture, so that the same (at least partially) fuses and fills the pores and intermediate spaces of the noble metal particles; as a result, oxidation processes on the noble metal are suppressed at increased temperature.

A temperature of at least 900° C., preferably in the range of 1000 to 1400° C. and very particularly preferably of approximately 1200° C. (i.e. ±100° C. and preferably ±50° C.), can be specified as suitable for the baking.

For the baking, the metal oxides are preferably selected such that the fusion point of the mixture thereof is below the temperature at which the substrate is sintered. In the context of a preferred embodiment, the dried screen-printing paste composition and the substrate is heated during baking to a temperature greater than or equal to the fusion point of the metal oxide mixture and smaller than or equal to the sintering temperature of the substrate.

The screen-printing paste applied onto the ceramic substrate using screen-printing technology can, following baking, be structured with the aid of an ultrashort pulse laser, in order to realize e.g. particularly fine structures, sharp edges or conductor-track spacings of smaller than 100 µm.

A further aspect of the present invention relates to a composite product comprising a ceramic substrate and an electrical conductor arrangement, which can be obtained according to the method described previously.

Alternatively, the present invention also relates to a composite product, which comprises a ceramic substrate and an electrical conductor arrangement on at least one side of the ceramic substrate, wherein the electrical conductor arrangement is based on particulate, preferably spherical, noble metal, comprising platinum and/or palladium, and metal oxides, and wherein the proportion of the metal oxides makes up 5 to 15 wt. % based on the weight of the electrical conductor arrangement.

The same specifications, which were listed previously in connection with the method according to the invention, are to be considered as preferred configurations for this composite product. In particular, it is consequently preferred, if the metal oxides in the electrical conductor arrangement contain silicon oxide ($SiO_2$), aluminium oxide ($Al_2O_3$) and barium oxide (BaO), wherein a proportion of at least 60 wt. %, further preferably at least 70 wt. %, even further preferably at least 80 wt. % and even further preferably at least 90 wt. % based on the total amount of the metal oxides in the electrical conductor arrangement, can be specified as preferred proportions for these oxides.

Furthermore, it is preferred for this composite product in particular, if the metal oxides in the electrical conductor arrangement comprise $SiO_2$, $Al_2O_3$ and BaO with a proportion of 35-41 wt. % $SiO_2$, 12-18 wt. % $Al_2O_3$ and 42-48 wt. % BaO based on the total weight of the metal oxides in the electrical conductor arrangement, and the proportion of all further oxidic components on the metal oxides is 2 wt. %.

Finally, it is in particular preferred for this composite product if the particulate noble metal is based on spherical platinum, wherein a platinum powder with the properties: platinum proportion: ≥99.7%, specific surface area (BET): 0.8-1.2 $m^2/g$, particle size distribution: D10: 0.2-0.5 µm, D50: 0.4-1.0 µm, D90: ≤2.5 µm and powder density: 9.0-11.5 $g/cm^3$, may be specified as particularly suitable.

For all of the previously specified composite products, it is preferred if the ceramic substrate comprises aluminium oxide or consists of the same.

A further aspect of the present invention relates to a particle sensor, which comprises a composite product, as described previously, and wherein the electrical conductor arrangement has at least two electrodes, which are separate from one another. For these electrodes, it is preferred if they are present as two interlocking comb electrodes.

To regenerate the electrodes, the particle sensor according to the invention may furthermore have a heating device. Furthermore, the particle sensor according to the invention may have a temperature measuring device. The heating device and/or the temperature measuring device can in this case be contacted by means of vias through one or more insulation layers and/or substrate layers.

A further aspect of the present invention ultimately relates to a heating device, which comprises a composite product, as described previously.

The following advantages can be realized in particular by means of the invention outlined previously:

- The adhesion of the baked noble-metal paste on ceramic substrates, particularly on $Al_2O_3$, is improved.
- In the case of high-temperature application of a sensor produced from a corresponding noble-metal paste, such as for example a soot sensor in the exhaust train or for heaters, the likelihood of the electrodes breaking off from the substrate is minimized.
- The noble-metal paste becomes smooth after baking and the surface has a metallic gloss, i.e. the applied layer is very compact and not porous. Thus, the applied layer has a high conductivity and is more stable.
- The high-melting metal-oxide composition does not lead, at burn-off temperatures of soot particle filters (approximately 750° C.), to fusion of the noble-metal layer.
- The electrical resistance of the baked paste can be reproduced very well in various production batches.

In the following, the present invention is described on the basis of a few illustrative examples, which should not be considered in any form as definitive for the protective scope of the present application, however.

EXAMPLES

Example 1

Compositions with a platinum-particle content in the range of 100 to 85 wt. % and a content of glass-forming metal oxides in the range of 0 to 15 wt. % (based on the total amount of metal oxides and platinum particles in the composition) were investigated for their adhesion and electrical conductivity. The composition of the glass-forming metal oxides was 45 wt. % BaO, 38 wt. % $SiO_2$, 15 wt. % $Al_2O_3$ and 2 wt. % further oxidic components. In this case, a very good adhesion was shown for a content of glass-forming metal oxides of 15 wt. %. The sheet resistance increased with an increasing content of glass-forming metal oxides.

In the case of other pastes based on the same platinum powder (Tanaka TR-708EZ9 or TR-708HSC), an unsatisfactory adhesion was, by contrast, shown in corresponding adhesion tests. The results of these investigations are reproduced in Table 1:

TABLE 1

| Proportion of glass-forming metal oxides (wt. %) based on solids content | Adhesion | Electrical conductivity |
|---|---|---|
| 0 | -- | ++++ |
| 5 | - | +++ |
| 10 | + | ++ |
| 15 | ++ | + |

Example 2

Various mixtures of metal oxides with a proportion of 12 wt. % based on the total weight of platinum powder (as specified in Example 1) and glass-forming metal oxides were formulated to pastes. The pastes additionally contained ethyl cellulose and texanol as binder and solvent in a proportion of approx. 15 wt. %.

The pastes were subsequently applied onto aluminium substrates with the aid of screen printing, dried and subsequently baked at 1200° C.

The electrodes produced in this manner were tested with respect to the electrical resistance and the thermal expansion. The processability of the paste used was likewise evaluated. The results of these investigations are listed in Table 2:

TABLE 2

| No. | Glass composition [wt. %] | | | | El. resistance | Therm. expansion | Processability |
|---|---|---|---|---|---|---|---|
| | BaO | SiO$_2$ | Al$_2$O$_3$ | Rest | | | |
| 1 | 45 | 38 | 15 | 2 | ++ | ++ | + |
| 2 | 42 | 36 | 20 | 2 | +++ | -- | -- |
| 3 | 48 | 40 | 10 | 2 | --- | -- | ++ |
| 4 | 41 | 43 | 14 | 2 | -- | + | + |
| 5 | 49 | 33 | 16 | 2 | + | + | - |
| 6 | 50 | 34 | 14 | 2 | -- | + | + |
| 7 | 40 | 42 | 16 | 2 | + | + | - |

+, ++ and +++ label particularly suitable properties for the application, –, -- and --- label properties that are still acceptable to unsatisfactory The composition No. 1 delivered the most beneficial combination of electrical resistance, thermal expansion and processability.

Mixtures, which differed considerably in their composition from the compositions according to Nos. 1-7, either could not be melted well enough, had too low an electrical resistance or had an unsatisfactory melting point for an application as a soot sensor.

The invention claimed is:

1. A screen-printing paste composition for producing an electrical conductor arrangement comprising:
    particulate noble metal, comprising platinum and/or palladium;
    metal oxides; and
    organic binders and/or solvents;
    wherein the proportion of metal oxides in the screen-printing paste composition is from 5 to 15 wt. %, based on the total amount of platinum, palladium and metal oxides;
    wherein the content of boron oxides in the metal oxides is ≤2 wt. %; and
    wherein SiO$_2$, Al$_2$O$_3$ and BaO make up a proportion of at least 90 wt. % of the metallic oxides in the screen-printing paste composition.

2. The screen-printing paste composition according to claim 1, wherein the particulate noble metal is present in the form of a platinum alloy.

3. The screen-printing paste composition according to claim 1, wherein the particulate noble metal is present in the form of platinum.

4. The screen-printing paste composition according to claim 3, wherein the particulate platinum is present in the screen-printing paste composition in the form of spherical platinum and is based on a Pt powder with the properties:
    platinum proportion: ≥99.7%
    specific surface area (BET): 0.8-1.2 m$^2$/g
    particle size distribution:
        D10: 0.2-0.5 μm
        D50: 0.4-1.0 μm
        D90: ≤2.5 μm
    powder density: 9.0-11.5 g/cm$^3$.

5. The screen-printing paste composition according to claim 1, wherein the metal oxides comprise SiO$_2$, Al$_2$O$_3$ and BaO with a proportion of 35-41 wt. % SiO$_2$, 12-18 wt. % Al$_2$O$_3$ and 42-48 wt. % BaO based on the total weight of the metal oxides in the screen-printing paste composition, wherein the total proportion of all further oxidic components on the metal oxides in the screen-printing paste composition is ≤2 wt. %.

6. The screen-printing paste composition according to claim 1, wherein the organic binder comprises ethyl cellulose and/or 2,2,4-trimethyl-1,3-pentanediol monoisobutyrate as solvent.

7. A method for producing an electrical conductor arrangement on a ceramic substrate, comprising:
    applying a screen-printing paste composition according to claim 1 onto the ceramic substrate; and
    drying and subsequently baking the screen-printing paste composition creating an electrical conductor arrangement.

8. A composite product comprising a ceramic substrate and an electrical conductor arrangement which is obtained according to a method according to claim 7.

* * * * *